United States Patent
Michitsuji et al.

(10) Patent No.: US 9,963,157 B2
(45) Date of Patent: May 8, 2018

(54) METHOD OF MEASURING CONDITION OF TRACK USING VEHICLE FOR COMMERCIAL OPERATION AND VEHICLE FOR COMMERCIAL OPERATION FOR MEASURING CONDITION OF TRACK

(71) Applicant: NIPPON STEEL & SUMITOMO METAL CORPORATION, Tokyo (JP)

(72) Inventors: Yohei Michitsuji, Hitachi (JP); Ryo Matsui, Hitachi (JP); Yasuhiro Sato, Chofu (JP); Hirotaka Mori, Chofu (JP); Makoto Shimizu, Tokyo (JP); Jun Kurihara, Tokyo (JP); Tomohiro Seki, Tokyo (JP); Hiroshi Obayashi, Tokyo (JP); Masaaki Mizuno, Yao (JP); Masuhisa Tanimoto, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 236 days.

(21) Appl. No.: 14/916,228

(22) PCT Filed: Sep. 4, 2014

(86) PCT No.: PCT/JP2014/073283
§ 371 (c)(1),
(2) Date: Mar. 3, 2016

(87) PCT Pub. No.: WO2015/033988
PCT Pub. Date: Mar. 12, 2015

(65) Prior Publication Data
US 2016/0194013 A1 Jul. 7, 2016

(30) Foreign Application Priority Data
Sep. 6, 2013 (JP) .................................. 2013-184620

(51) Int. Cl.
*B61K 9/08* (2006.01)
*B61L 23/04* (2006.01)
(Continued)

(52) U.S. Cl.
CPC .............. *B61L 23/047* (2013.01); *B61K 9/08* (2013.01); *B61L 23/048* (2013.01);
(Continued)

(58) Field of Classification Search
CPC ... B61K 9/08; B61K 9/00; B61K 9/02; B61K 9/12
See application file for complete search history.

(56) References Cited

U.S. PATENT DOCUMENTS 4,399,881 A * 8/1983 Theurer ................. B61D 15/02
177/137
6,323,441 B1 * 11/2001 Hager ................... B60T 8/1893
105/463.1
(Continued)

FOREIGN PATENT DOCUMENTS

DE 141350 4/1980
JP 61-147102 7/1986
(Continued)

OTHER PUBLICATIONS

Ichiro Nakamura et al., "Measuring Equipments . . . Tokaido Line", Hitachi Review, vol. 47, No. 4, pp. 58-61, Apr. 25, 1965.
(Continued)

*Primary Examiner* — Jaehwan Oh
(74) *Attorney, Agent, or Firm* — Clark & Brody

(57) ABSTRACT

A method of precisely measuring the track twist of a track on which a vehicle for commercial operation is travelling using this vehicle is to be provided. The method includes measuring a condition of a track (R) on which a vehicle for commercial operation (100) is travelling using this vehicle
(Continued)

(100). The vehicle for commercial operation includes a bogie (10). The bogie includes four wheels (1) and primary springs (2) provided to correspond to the four wheels (1) and support the corresponding wheels (1), and is capable of measuring a wheel load of each of the four wheels (1). The method includes the steps of: measuring the wheel load of each wheel (1) (S13); calculating the displacement of each primary spring (2) based on the measured wheel load (S15); and calculating the track twist (h) of the track (R) based on the calculated displacements of the primary springs (2) (S18).

12 Claims, 16 Drawing Sheets

(51) Int. Cl.
    *G01B 21/04*     (2006.01)
    *B61L 27/00*     (2006.01)
    *G01M 99/00*     (2011.01)

(52) U.S. Cl.
    CPC .......... *B61L 27/0088* (2013.01); *G01B 21/04* (2013.01); *G01M 99/00* (2013.01)

(56) References Cited

U.S. PATENT DOCUMENTS

| | | | |
|---|---|---|---|
| 6,415,522 B1* | 7/2002 | Ganz | B61K 9/08 33/1 Q |
| 2009/0094848 A1* | 4/2009 | Patko | B61K 9/08 33/523.2 |
| 2015/0247782 A1* | 9/2015 | Sato | G01L 5/18 73/788 |

FOREIGN PATENT DOCUMENTS

| | | |
|---|---|---|
| JP | 2001-130408 | 5/2001 |
| JP | 2003-240626 | 8/2003 |
| JP | 2006-088967 | 4/2006 |
| WO | 2007/088321 | 8/2007 |

OTHER PUBLICATIONS

Hiroyuki Ohno et al., "New Monitoring . . . Special Wheel-Set", Transactions of the Japan Society of Mechanical Engineers, Series C, vol. 77, No. 774, pp. 147-155, Feb. 25, 2011.

\* cited by examiner

METHOD OF MEASURING CONDITION OF TRACK USING VEHICLE FOR COMMERCIAL OPERATION AND VEHICLE FOR COMMERCIAL OPERATION FOR MEASURING CONDITION OF TRACK

TECHNICAL FIELD

The present invention relates to a method of measuring a condition of a track using a vehicle for commercial operation and a vehicle for commercial operation for measuring a condition of a track, and more particularly, to a method of measuring the track twist of a track using a vehicle for commercial operation and a vehicle for commercial operation for measuring the track twist of a track.

BACKGROUND ART

Track displacements are known that can be used as indicators of the conditions of a track on which railroad vehicles travel. Five track displacements are known: gauge displacement, cross level displacement, longitudinal level displacement, alignment displacement, and track twist. When such track displacements increase, railroad vehicles travelling thereon shake more such that the passengers feel uncomfortable. In addition, when track displacements increase, the travel safety of railroad vehicles may be impaired, potentially causing a derailment. Accordingly, the track displacements should be measured on a regular basis and the track should be repaired at an appropriate time.

A track twist indicates a twist relative to the plane of a track, and means the difference between the cross level displacements of two points separated by a predetermined distance along the length direction of the track. Cross level displacement means the difference between the heights of the left and right rails making up the track.

Traditionally, track displacements are measured by a special track inspection car (for example, see JP 2001-130408 A). Track inspection cars are not for commercial operation, and are only available in small numbers. As such, track displacements cannot be measured frequently, and must be measured in a non-operation period, such as in the middle of the night. Thus, needs exist for the ability to measure track displacements frequently using a vehicle for commercial operation instead of a track inspection car.

Meanwhile, it has been proposed to use, in a vehicle for commercial operation, a bogie capable of measuring wheel load and lateral force (PQ monitoring bogie) to frequently measure derailment coefficient, which is an indicator of the travel safety of a railroad vehicle (for example, see JP 2006-88967 A, and "Method of Measuring Wheel/Rail Contact Force Without Using PQ Wheel Axel", Collected Papers from the Japan Society of Mechanical Engineers (Compilation C), Vol. 77, No. 774 (February 2011), pp. 147-155).

Wheel load is a vertical force acting between a wheel of a railroad vehicle and a rail of a track. Lateral force is a horizontal force (i.e. force in a direction along the axles) acting between the wheel and rail. Derailment coefficient is an indicator represented by Q/P where P is the wheel load and Q is the lateral force.

SUMMARY OF THE INVENTION

Using the above PQ monitoring bogie make it possible to frequently measure derailment coefficient using a vehicle for commercial operation. However, no proposal has been made to measure track displacements, especially track twist, using a PQ monitoring bogie.

An object of the present invention is to provide a method of measuring the track twist of a track using a vehicle for commercial operation and a vehicle for commercial operation for measuring the track twist of a track.

A method in an embodiment of the present invention is a method of measuring a condition of a track using a vehicle for commercial operation. The vehicle for commercial operation includes a bogie. The bogie includes four wheels and primary springs provided to correspond to the four wheels and support the corresponding wheels, and is capable of measuring a wheel load of each of the four wheels. The method includes:

step (1): measuring the wheel load of each wheel;
step (2): calculating a displacement of each primary spring based on the measured wheel load; and
step (3): calculating a track twist of the track based on the calculated displacements of the primary springs.

A vehicle for commercial operation in an embodiment of the present invention measures a condition of a track. The vehicle for commercial operation includes a bogie and a computing unit. The bogie includes four wheels and primary springs provided to correspond to the four wheels and support the corresponding wheels, and is capable of measuring a wheel load of each of the four wheels. The computing unit measures the condition of the track based on the wheel loads of the four wheels. The computing unit includes a wheel load measuring unit, a spring displacement calculating unit, and a track twist calculating unit. The wheel load measuring unit measures the wheel load of each wheel. The spring displacement calculating unit calculates displacements of the primary springs based on the measured wheel loads. The track twist calculating unit calculates the track twist of the track based on the calculated displacements of the primary springs.

The method and vehicle for commercial operation in embodiments of the present invention are capable of measuring the track twist of a track.

EMBODIMENTS FOR CARRYING OUT THE INVENTION

Figure 1A:
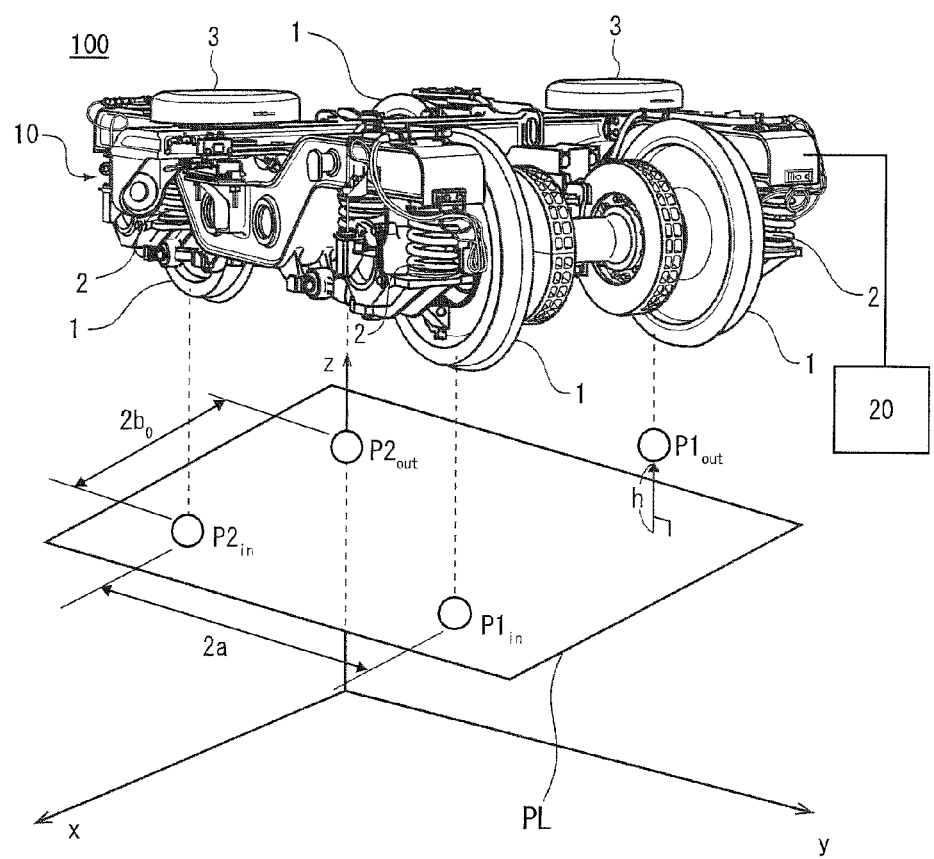
FIG. 1A schematically illustrates a bogie included in a vehicle for commercial operation in an embodiment of the present invention and illustrates a method of measuring conditions of a track.

A method in an embodiment of the present invention is a method of measuring a condition of a track using a vehicle for commercial operation. The vehicle for commercial operation includes a bogie. The bogie includes four wheels and primary springs provided to correspond to the four wheels and support the corresponding wheels, and is capable of measuring a wheel load of each of the four wheels. The method includes:

step (1): measuring the wheel load of each wheel;

step (2): calculating a displacement of each primary spring based on the measured wheel load; and step (3): calculating a track twist of the track based on the calculated displacements of the primary springs.

According to the above method, the wheel load of a wheel is measured. The displacements of the primary springs are calculated based on the measured wheel loads. The displacements of the first primary springs may be calculated based on the measured wheel loads using Hooke's law. That is, the correlation of load on a primary spring and displacement are suitably acquired in advance.

According to the above method, the track twist is calculated based on the displacements of the four primary springs. More specifically, for example, the coordinates of the displacements of the four primary springs are first calculated. A plane is calculated that passes through the coordinates of the displacements of three of the four primary springs. The distance between this plane and the coordinates of the displacement of the remaining primary spring is calculated. The track twist is calculated based on this distance. The coordinates of the displacement of a primary spring are represented by the plane coordinates (xy coordinates) of the position at which the primary spring is attached (corresponding to the position of the associated wheel) and the vertical coordinate (z coordinate) of the displacement. The coordinates of the displacement of a primary spring vary depending on the height of the portion of the track that corresponds to the position of the primary spring, because the position of the wheel in the vertical direction varies depending on the height of the track and the displacement of the primary spring varies depending on the position of the wheel in the vertical direction.

As such, if there is no track twist, that is, if there is no difference between the cross level displacements (i.e. difference between the heights of the left and right rails) of two points separated by a predetermined distance along the length direction of the track, then, the coordinates of the displacements of the four primary springs are on the same plane. In other words, the distance between the plane that passes through the coordinates of the displacements of three primary springs and the coordinates of the displacement of the remaining primary spring is substantially equal to the track twist (i.e. absolute value of the track twist). Thus, the above method makes it possible to precisely calculate track twist.

Traditionally, the travelling distance of a vehicle for commercial operation starting from a predetermined origin is calculated based on the number of rotations of a wheel. More specifically, the circumference of a wheel calculated from the outer diameter of the wheel when it begins to be used and the measured number of rotations of the wheel are integrated to calculate the travelling distance. However, the outer diameter of a wheel decreases due to wear as it travels repeatedly. Thus, the travelling distance calculated from the outer diameter of the wheel when it begins to be used has an error. Further, a slip or skid of the wheel may cause an error.

Thus, for example, when a derailment coefficient distribution (i.e. graph with a horizontal axis representing the travelling distance of a vehicle for commercial operation starting from a predetermined origin and a vertical axis representing derailment coefficient) is used to identify the travelling distance of the vehicle at which the derailment coefficient has an abnormal value, there is an error relative to the actual travelling distance if a certain period of time has passed since the wheel began to be used. Thus, it is difficult to precisely identify the position on the track where the derailment coefficient has an abnormal value.

As discussed above, the above method makes it possible to precisely calculate the track twist. More specifically, variations in track twist calculated for the same track are relatively small.

The present inventors expected that the measurement error in the travelling distance of a vehicle for commercial operation as discussed above might be corrected by taking advantage of the fact that variations in track twist measured by the above method are relatively small, and did an extended research and arrived at the preferred aspects described below.

That is, preferably, the above method further includes:

step (4): calculating a travelling distance of the vehicle for commercial operation starting from a predetermined origin based on a number of rotations of one of the four wheels;

step (5): calculating a distribution of the track twist based on the calculated travelling distance and the calculated track twist;

step (6): acquiring a correspondence between the travelling distance calculated at a position separated from the origin by a known distance and the distance of this position from the origin (i.e. known distance);

step (7): correcting the calculated distribution of the track twist based on the acquired correspondence to calculate a reference distribution of track twist; and step (8): calculating a correction amount for matching an object distribution calculated after calculation of the reference distribution to the reference distribution.

According to the method of the above preferred aspect, the distribution of the track twist of a track is calculated. The distribution of track twist has a first axis representing the calculated travelling distance and a second axis perpendicular to the first axis representing the calculated track twist, for example. The travelling distance in the calculated distribution of track twist is calculated based on the number of rotations of the wheel. As such, it may have an error due to wear of the wheel and a slip and skid.

The correspondence between the travelling distance calculated at a position separated from the origin by a known distance and the distance of this position from the origin (i.e. known distance) is acquired. More specifically, for example, reflective plates are provided by two positions on a track separated from a predetermined origin by distances that are known from accurate surveys. A light projecting/receiving photoelectronic sensor is provided on a vehicle for commercial operation. Laser beams are directed by the photoelectronic sensor to the reflective plates. Laser beams reflected from the reflected plates are received by the photoelectronic sensor. At these time points, it is recognized that the vehicle has arrived at the two positions on the above track. The travelling distances of the vehicle calculated based on the numbers of rotations of the wheel at these times are recognized. Thus, the correspondence between the (two) positions on the track separated from a predetermined origin by known distances and the travelling distances of the vehicle at these positions, that is the travelling distances of the vehicle calculated based on the numbers of rotations of the wheel is acquired. For example, it is assumed that the two positions on the track are separated from the predetermined origin by the distances of kilopost values X1 and Y1, and the calculated travelling distances at these positions (i.e. travelling distances of the vehicle calculated based on the numbers of rotations of the wheel) have kilopost values X2 and Y2. Then, the relationship represented by kilopost value X2 corresponding to kilopost value X1 and kilopost value Y2 corresponding to kilopost value Y1 is acquired.

Based on the above acquired correspondence, the distribution of track twist is corrected. For example, the distribution of track twist is corrected such that the first axis above represents the true travelling distance of the vehicle for commercial operation. More specifically, the position at which the travelling distance in the distribution of track twist (i.e. travelling distance calculated based on the number of rotations of the wheel) is kilopost value X2 has, in reality, kilopost value X1. The position at which the travelling distance in the distribution of track twist (i.e. travelling distance calculated based on the number of rotations of the wheel) is kilopost value Y2 has, in reality, kilopost value Y1. In view of this, the distribution of track twist is corrected such that the actual values are provided. More specifically, the distribution of track twist is translated and/or expanded/contracted with respect to the above first axis. The distribution of track twist after correction is the distribution of track twist that serves as a reference (i.e. reference distribution).

The distribution of track twist calculated after calculation of the reference distribution (i.e. object distribution) is corrected so as to match the object distribution to the reference distribution. More specifically, for example, the object distribution is translated and/or expanded/contracted with respect to the first axis by a matching approach using the simplex method, for example, such that the object distribution matches the reference distribution. This is based on the idea that, since variations in track twist calculated for the same track are relatively small, just correcting, with respect to the first axis, another distribution of track twist that may have a calculation error in terms of travelling distance will match this distribution to the reference distribution. The travelling distance represented on the first axis of the distribution of track twist after the above correction is proximate to the true travelling distance.

Thus, when the object distribution is corrected, the correction amount is calculated. When the object distribution is corrected with respect to the first axis, that is, when the object distribution is translated and/or expanded/contracted with respect to the first axis, the correction amount is the amount of translation and/or the magnification for expansion/contraction.

The above correspondence is only required to be acquired when the reference distribution is to be calculated. For example, a correspondence may be acquired in a non-operation period, such as in the middle of the night, and the photoelectronic sensor need not frequently project laser beams to and receive such beams from the reflective plates during daytime.

Preferably, the method of the above preferred aspect further includes:

step (9): calculating a distribution of a parameter relating to the wheel load, the parameter being used in calculating track twists constituting the object distribution; and step (10): correcting the distribution of the parameter based on the correction amount calculated when the object distribution was corrected.

According to the method of the above preferred aspect, the distribution of a parameter is calculated. The parameter may be wheel load itself or derailment coefficient, for example. The distribution of the parameter has a first axis representing the travelling distance of the vehicle for commercial operation calculated based on the number of rotations of the wheel, and a second axis representing a parameter relating to the wheel load used in calculating the track twists constituting the object distribution. The travelling distance in the calculated distribution of the parameter has been calculated based on the number of rotations of the vehicle. As such, it has a measurement error due to wear of the wheel, for example.

Based on the correction amount calculated when the object distribution was to be corrected, the distribution of the parameter is corrected. More specifically, the distribution of the parameter is corrected with respect to the first axis by the same amount as the above correction amount (i.e. amount of translation and/or magnification for expansion/contraction). This is based on the idea that the time point for measuring the wheel load used in calculating the track twists constituting the object distribution is the same as the time point for measuring the parameter relating to the wheel load used in calculating the distribution of the parameter and the travelling distance represented on the first axis of each of these distributions (i.e. travelling distance of the vehicle for commercial operation calculated based on the number of rotations of the wheel) has the same measurement error, which means that the same correction is suitably done in order that the first axis of the distribution of the parameter represents the true travelling distance of the vehicle. The travelling distance represented on the first axis of the distribution of the parameter that has been corrected in the above manner is proximate to the true travelling distance.

According to the method of the above preferred aspect, the travelling distance represented on the first axis of the distribution of the parameter (i.e. travelling distance of the vehicle for commercial operation calculated based on the number of rotations of the wheel) is corrected to be proximate to the true travelling distance. This makes it possible to precisely identify the position on the track where the parameter (for example, derailment coefficient) has an abnormal value. Thus, the track may be repaired at the appropriate position, for example.

In the method of the above preferred aspect, the calculated reference distribution may be used to correct the distribution of the parameter.

A vehicle for commercial operation in an embodiment of the present invention measures a condition of a track. The vehicle for commercial operation includes a bogie and a computing unit. The bogie includes four wheels and four primary springs provided to correspond to the four wheels and support the corresponding wheels, and is capable of measuring a wheel load of each of the four wheels. The computing unit measures the condition of the track based on the wheel load of each of the four wheels. The computing unit includes a wheel load measuring unit, a spring displacement calculating unit, and a track twist calculating unit. The wheel load measuring unit measures the wheel load of each wheel. The spring displacement calculating unit calculates displacements of the primary springs based on the measured wheel loads. The track twist calculating unit calculates the track twist of the track based on the calculated displacements of the primary springs.

The above vehicle for commercial operation is capable of precisely measuring the track twist of the track on which the vehicle travels using this vehicle. Thus, track displacement can be measured frequently using a vehicle for commercial operation instead of a track inspection car as is traditionally used.

Preferably, the computing unit further includes a travelling distance calculating unit, a distribution calculating unit, a correspondence acquiring unit, a reference distribution calculating unit, and a correction amount calculating unit. The travelling distance calculating unit calculates a travelling distance of the vehicle for commercial operation starting from a predetermined origin based on a number or rotations of one of the four wheels. The distribution calculating unit calculates a distribution of the track twist based on the calculated travelling distance and the calculated track twist. The correspondence acquiring unit acquires a correspondence between the travelling distance calculated at a position separated from the origin by a known distance and the distance from the origin. The reference distribution calculating unit corrects the calculated distribution of the track twist based on the acquired correspondence to calculate a reference distribution of the track twist. The correction amount calculating unit calculates a correction amount for matching an object distribution calculated after calculation of the reference distribution to the reference distribution.

The vehicle for commercial operation of the above aspect is capable of correcting a measurement error in the travelling distance of the vehicle.

To calculate the distribution of track twist, for example, the distribution calculating unit uses a first axis to represent the calculated travelling distance and uses a second axis perpendicular to the first axis to represent the calculated track twist. The reference distribution calculating unit corrects the distribution of track twist and uses the first axis to represent a true travelling distance of the vehicle for commercial operation. To calculate the correction amount, the correction amount calculating unit corrects the object distribution with respect to the first axis.

More preferably, the computing unit further includes a parameter distribution calculating unit and a parameter distribution correcting unit. The parameter distribution calculating unit calculates a distribution of a parameter relating to the wheel load, the parameter being used in calculating track twists constituting the object distribution. The parameter distribution correcting unit corrects the distribution of the parameter based on the calculated correction amount.

The vehicle for commercial operation of the above aspect is capable of precisely identifying the position on the track where the parameter (for example, derailment coefficient) has an abnormal value.

To calculate the distribution of the parameter, the parameter distribution calculating unit uses the first axis to represent the travelling distance and uses the second axis to represent the parameter, for example.

The method of measuring a condition of a track and the vehicle for commercial operation for measuring a condition of a track in embodiments of the present invention will be described with reference to the drawings as necessary.

Figure 1B:
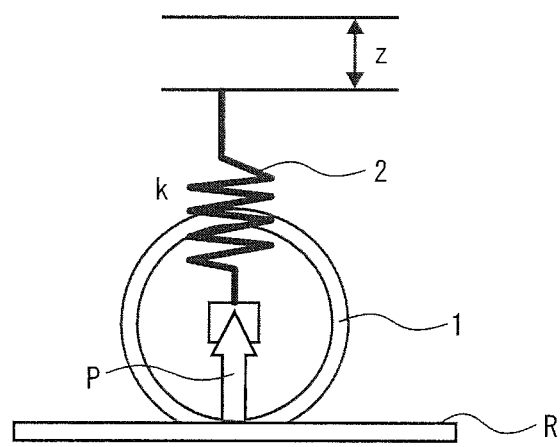
FIG. 1B illustrates a method of calculating the displacement of a primary spring.

FIG. 1A schematically illustrates a bogie 10 included in a vehicle for commercial operation 100 in an embodiment of the present invention and illustrates a method of measuring conditions of tracks. FIG. 1B illustrates a method of calculating the displacement of a primary spring.

As shown in FIG. 1A, the vehicle for commercial operation 100 includes a bogie 10 and a computing unit 20. The bogie may be a PQ monitoring bogie, for example. The bogie 10 includes four wheels 1, four primary springs 2, and two secondary springs 3. The four wheels 1 are positioned toward the front, rear, left and right. The four primary springs 2 are provided to correspond to the four wheels 1 and support the corresponding wheels 1. The bogie 10 measures the wheel load of each of the wheels 1. The wheel load may be measured by a strain gauge, for example. The computing unit 20 measures conditions of a track R based on the measurements of wheel load.

The computing unit 20 first calculates the displacements of the four primary springs 2 based on the measurements of wheel load.

The computing unit 20 stores in advance correlation data that represent a correlation between the load applied to a primary spring 2 and displacement. Based on the measurements of wheel load P and the stored correlation data, the computing unit 20 calculates the displacement z of the primary spring 2 (i.e. displacement from its natural length). The spring constant k of a primary spring 2 calculated from the correlation data may range from 500 to 2000 kN/m, for example.

The coordinates of the displacement of the primary spring 2 supporting the wheel 1 located to the front left with respect to the travelling direction of the bogie 10 are denoted by $P1_{out}$, and the displacement is denoted by $z1_{out}$. The coordinates of the displacement of the primary spring 2 supporting the wheel 1 located to the front right with respect to the travelling direction of the bogie 10 are denoted by $P1_{in}$, and the displacement is denoted by $z1_{in}$. The coordinates of the displacement of the primary spring 2 supporting the wheel 1 located to the rear left with respect to the travelling direction of the bogie 10 are denoted by $P2_{out}$, and the displacement is denoted by $z2_{out}$. Finally, the coordinates of the displacement of the primary spring 2 supporting the wheel 1 located to the rear right with respect to the travelling direction of the bogie 10 are denoted by $P2_{in}$, and the displacement is denoted by $z2_{in}$.

The coordinates of the displacement of the primary spring 2 supporting the wheel 1 located to the rear left with respect to the travelling direction of the bogie 10 represent the origin of the plane coordinate system (i.e. xy coordinate system), and the distance between the front and rear axles is denoted by 2a, while the distance between the left and right wheels is denoted by $2b_0$. Then, the coordinates of the displacements of the primary springs 2 are represented by $P1_{out}(0, 2a, z1_{out})$, $P1_{in}(2b_0, 2a, z1_{in})$, $P2_{out}(0, 0, z2_{out})$, and $P2_{in}(2b_0, 0, z2_{in})$.

Next, the computing unit 20 calculates the coordinates $P1_{out}$, $P1_{in}$, $P2_{out}$ and $P2_{in}$ of the displacements of the primary springs 2 from the calculated displacements $z1_{out}$, $z1_{in}$, $z2_{out}$ and $z2_{in}$ of the primary springs 2.

Next, the computing unit 20 calculates the plane that passes through the calculated coordinates of the displacements of three of the four primary springs 2.

The computing unit 20 stores information about the track R on which the bogie 10 travels. Thus, the computing unit 20 knows at which geographical point on the track R the bogie 10 is currently travelling. Thus, the computing unit 20 knows whether each of the four wheels 1 is currently located on the outside rail or on the inside rail. The computing unit 20 calculates the plane that passes the coordinates of the displacements of three of the four primary springs 2 other than the primary spring 2 supporting the wheel 1 located to the front of the bogie 10 and on the outside rail.

Supposing that the coordinates of the displacement of the primary spring 2 supporting the wheel 1 located to the front of the bogie 10 and on the outside rail are represented by $P1_{out}(0, 2a, z1_{out})$, then, the computing unit 20 calculates the plane PL that passes through the three coordinate sets $P1_{in}(2b_0, 2a, z1_{in})$, $P2_{out}(0, 0, z2_{out})$, and $P2_{in}(2b_0, 0, z2_{in})$.

More specifically, the plane PL is represented by equation (1) below, and the coefficients $C_1$ to $C_4$ in equation (1) are determined as this plane PL passes through the three coordinate sets $P1_{in}$, $P2_{out}$ and $P2_{in}$.

$$C_1 x + C_2 y + C_3 z + C_4 = 0 \quad (1).$$

Subsequently, based on the distance between the calculated plane PL represented by equation (1) and the coordinates $P1_{out}(0, 2a, z1_{out})$ of the displacement of the remaining primary spring, the computing unit 20 calculates the track twist h of the track.

More specifically, the xyz coordinates in the coordinates $P1_{out}(0, 2a, z1_{out})$ are substituted for x, y and z in equation (2) below to calculate the track twist h. The absolute value of the track twist h represented by equation (2) below corresponds to the distance between the plane PL represented by equation (1) and the coordinates $P1_{out}(0, 2a, z1_{out})$ of the displacement of the remaining primary spring.

[Formula 1]

$$h = \frac{C_1 x + C_2 y + C_3 z + C_4}{\sqrt{C_1^2 + C_2^2 + C_3^2}} \quad (2)$$

As described above, in the vehicle for commercial operation 100 and according to the method of measuring conditions of a track using the vehicle for commercial operation 100, the wheel loads of the four wheels 1 are measured. Based on the measurements of wheel load, the displacements of the four primary springs 2 are calculated. The plane that passes the coordinates of the displacements of three of the four primary springs 2 is calculated. Based on the distance between this plane and the coordinates of the displacement of the remaining primary spring 2, the track twist h is calculated. The coordinates of the displacement of a primary spring 2 vary depending on the height of the portion of the track R that corresponds to the position of the primary spring 2, because the position of the wheel 1 in the vertical direction varies depending on the height of the track R and the displacement of the primary spring 2 varies depending on the position of the wheel 1 in the vertical direction.

As such, if there is no track twist h, that is, if there is no difference between the cross level displacements (i.e. difference between the heights of the left and right rails) of two points separated by a predetermined distance 2a along the length direction of the track R, then, the coordinates of the displacements of the four primary springs 2 are on the same plane. In other words, the distance between the plane that passes through the coordinates of the displacements of three primary springs 2 and the coordinates of the displacement of the remaining primary spring 2 is substantially equal to the track twist h (i.e. absolute value of the track twist h). Thus, the vehicle for commercial operation 100 and the method of measuring conditions of the track using the vehicle 100 are capable of precisely calculating the track twist h.

Figure 2A:
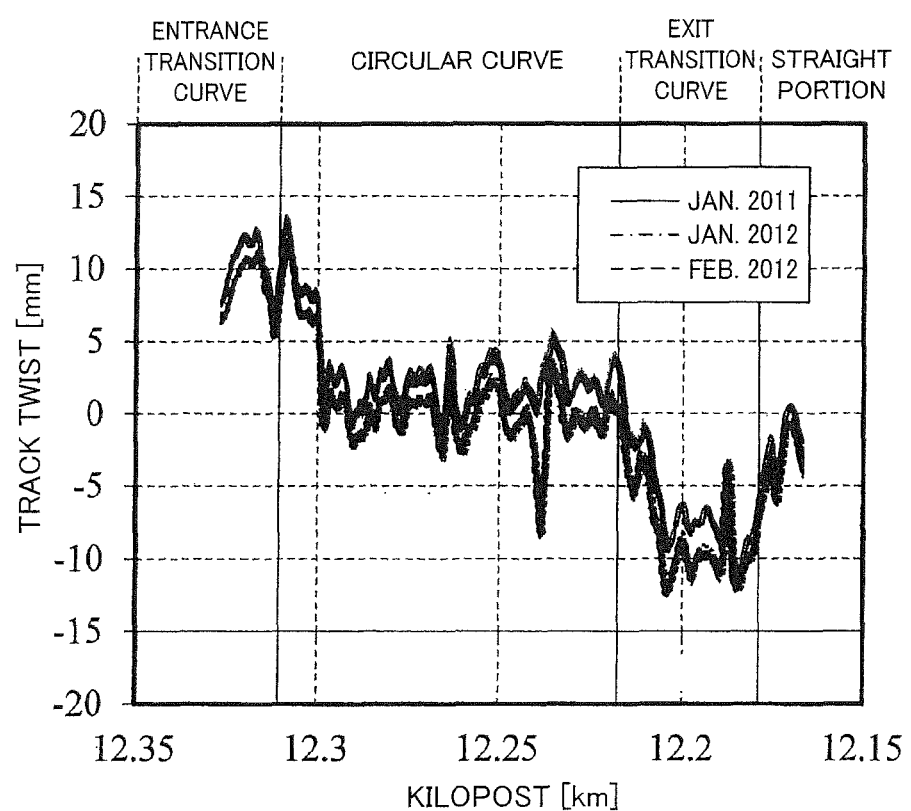
FIG. 2A is a graph illustrating example measurements of track twist in the same curve section obtained using the vehicle for commercial operation.
Figure 2B:
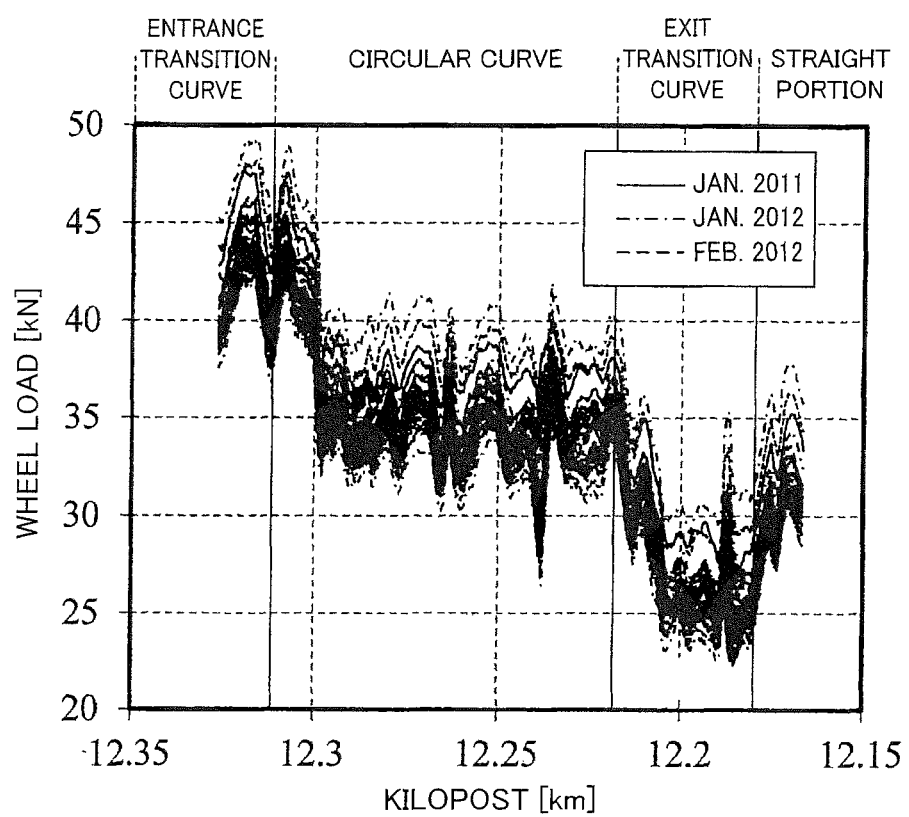
FIG. 2B is a graph illustrating example measurements of wheel load (i.e. wheel load for a wheel of the bogie located to the front and on the outside rail) in the same curve section obtained using the vehicle for commercial operation.

FIG. 2A is a graph illustrating example measurements of track twist in the same curve section obtained using the vehicle for commercial operation 100. FIG. 2B is a graph illustrating example measurements of wheel load (i.e. wheel load for a wheel 1 of the bogie 10 located to the front and on the outside rail) in the same curve section obtained using the vehicle for commercial operation 100. In the graphs of FIGS. 2A and 2B, circular curve means a portion with a constant radius of curve, and transition curve means a portion at an entrance or exit that connects a straight portion with the circular curve with gradually decreasing radius of curve from the straight portion toward the circular curve. The measurements were made in January 2011, January 2012 and February 2012, and 10 measurements were made in each of these months.

As will be understood from FIGS. 2A and 2B, the variations in track twist are smaller than the variations in wheel load, because the wheel load can easily change depending on the number of passengers, the positions of the passengers in the car and other factors, while the track twist is a twist in the track and does not change easily. Thus, the track twist calculated in the present embodiment is more useful for detecting abnormalities in the track R than the wheel load.

Figure 3A:
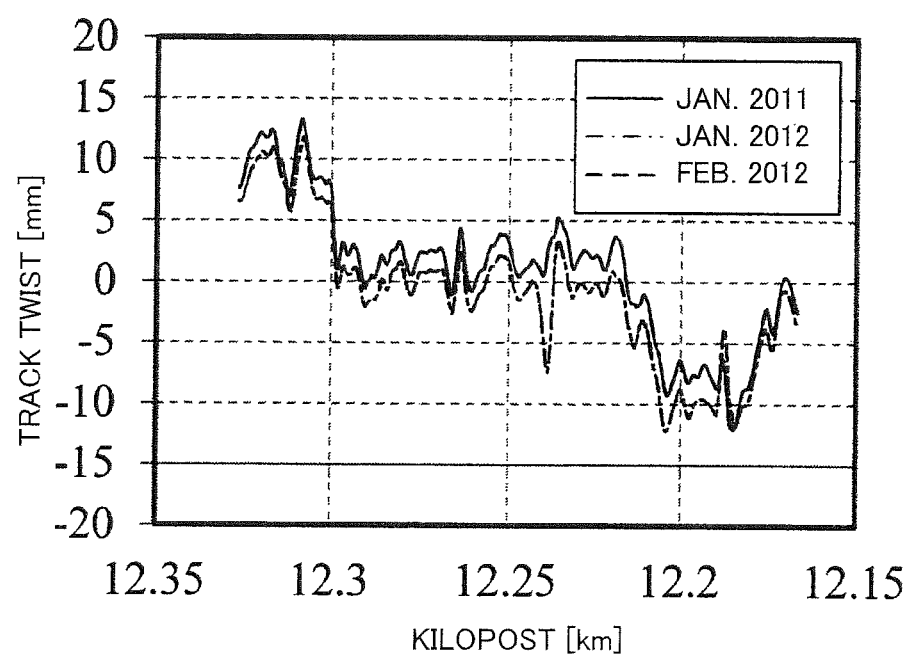
FIG. 3A is a graph illustrating the results of averaging track twist measurements shown in FIG. 2A at a predetermined interval.
Figure 3B:
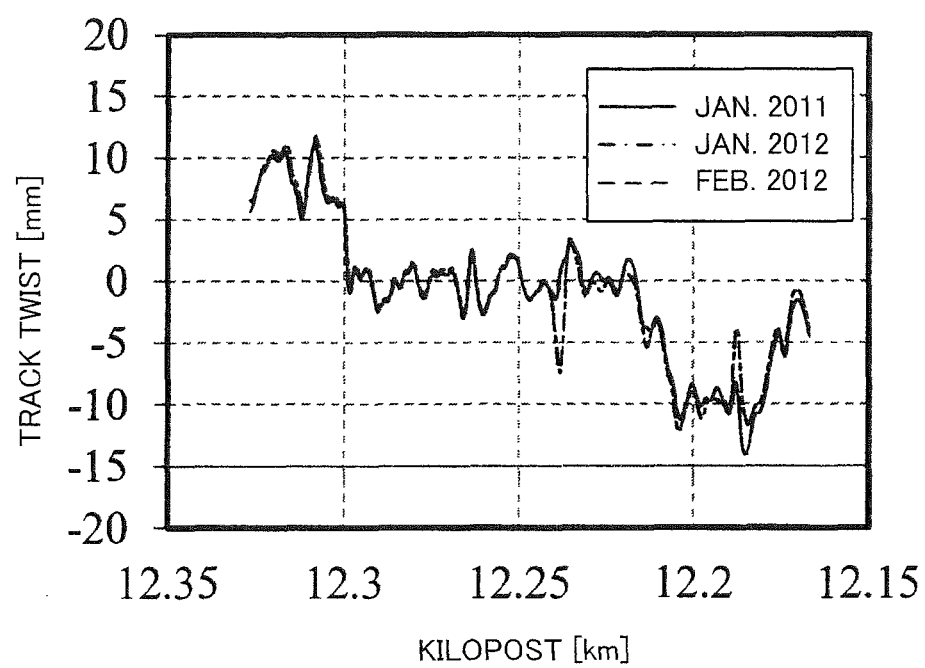
FIG. 3B is a graph illustrating the results of drift removal (i.e. offset correction) of the results shown in FIG. 3A.

FIG. 3A is a graph illustrating the results of averaging track twist measurements shown in FIG. 2A at a predetermined interval. FIG. 3B is a graph illustrating the results of drift removal (i.e. offset correction) of the results shown in FIG. 3A.

More specifically, FIG. 3A shows the results of averaging track twist measurements shown in FIG. 2A for one month, that is, the results of averaging 10 measurements in each of January 2011, January 2012 and February 2012. FIG. 3B shows the results of correcting the measured track twists by offsetting the wheel load measured directly after the vehicle for commercial operation 100 started to travel, assuming that there is no track twist directly after the vehicle 100 started to travel (normally, the wheel load measurements of the four wheels 1 are the same).

As will be understood from FIGS. 3A and 3B, the variations of the results are reduced by averaging and then offset correction compared with implementations where track twist is simply calculated (FIG. 2A). Thus, this method is effective at detecting abnormalities in the track R.

The computing unit 20 preferably performs temporal subtraction processing. More specifically, the computing unit 20 subtracts, from the current track twist obtained through the offset correction (see FIG. 3B), a track twist obtained before a certain time period with respect to a given track R.

Figure 4A:
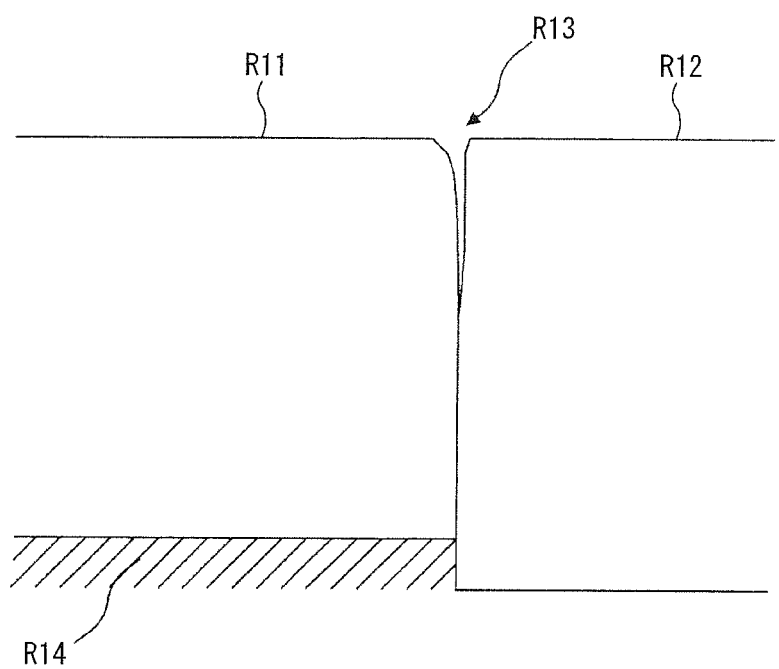
FIG. 4A schematically illustrates a portion of a track replaced by a new rail.
Figure 4B:
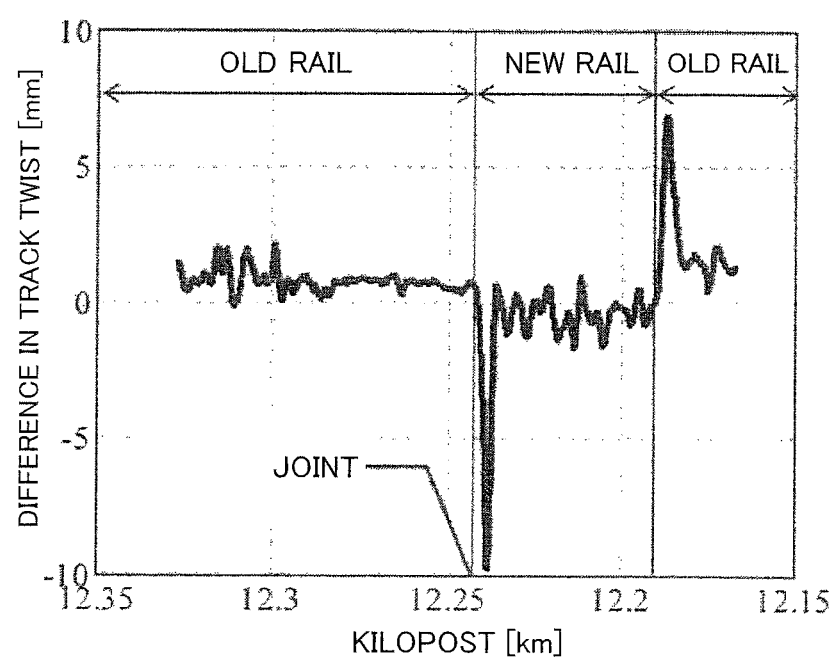
FIG. 4B is a graph illustrating the results of subtracting track twists before replacement by a new rail (i.e. track twists after offset correction) from track twists after replacement (i.e. track twists after offset correction).
Figure 4C:
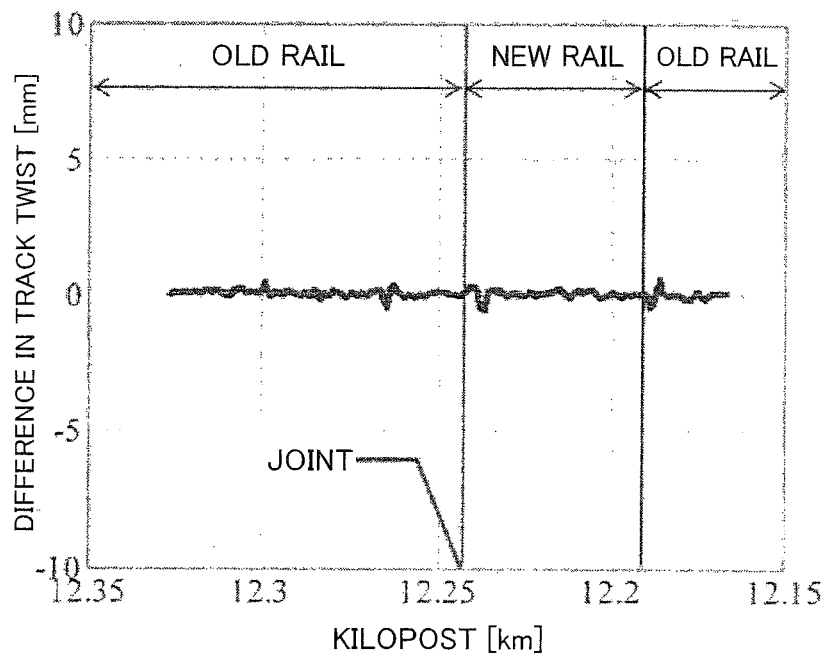
FIG. 4C is a graph illustrating the results of subtracting track twists after replacement by a new rail (i.e. track twists after offset correction), though measured earlier, from track twists after replacement by a new rail (i.e. track twists after offset correction).

FIG. 4A schematically illustrates a portion of a track R replaced by a new rail. FIG. 4B is a graph illustrating the results of subtracting track twists before replacement by a new rail (i.e. track twists after offset correction) from track twists after replacement (i.e. track twists after offset correction). FIG. 4C is a graph illustrating the results of subtracting track twists after replacement by a new rail (i.e. track twists after offset correction) from track twists after replacement by a new rail measured earlier (i.e. track twists after offset correction).

As shown in FIG. 4A, when a portion of a track R (i.e. one rail) was to be replaced by a new rail, a spacer R14 was placed below the portion of the old rail R11 close to the joint R13 between the old rail R11 and new rail R12 to prevent a bump from being produced at the joint R13. Consequently, a slope as measured in the height direction is produced locally, i.e. in the portion of the old rail R11 near the joint R13. This changes the difference between the heights of the left and right rails, causing a twist in the track R. In the implementation shown in FIG. 4A, the joint R13 is at the position of 12,238 kp.

As will be understood from FIG. 4B, temporal subtraction processing may be performed on a track twist to precisely detect the portion of the track R where its conditions change, i.e. the joint R13 between the new and old rails R12 and R11. On the other hand, as will be understood from FIG. 4C, if the conditions of the track R do no change, the difference obtained by the subtraction processing does not change. Thus, a change in the conditions of the track R can be detected with a low possibility of false detection.

In the implementations described with reference to FIGS. 3A, 3B, 4A, 4B and 4C, the computing unit 20 performs all of averaging, offset correction and temporal subtraction processing in this order. However, not all of these three steps must be performed; it is possible to perform only one or two of these three steps.

The vehicle for commercial operation 100 and the method of measuring conditions of a track using a vehicle for commercial operation 100 described above are capable of precisely calculating track twist. More specifically, as shown in FIGS. 2A, 3A and 3B, variations in track twist calculated for the same track R are relatively small. It is advantageous to take advantage of the fact that variations in track twist are small and correct an error in the measured travelling distance of the vehicle for commercial operation 100. This will be described in detail below with reference to FIGS. 5A to 5C.

Figure 5A:
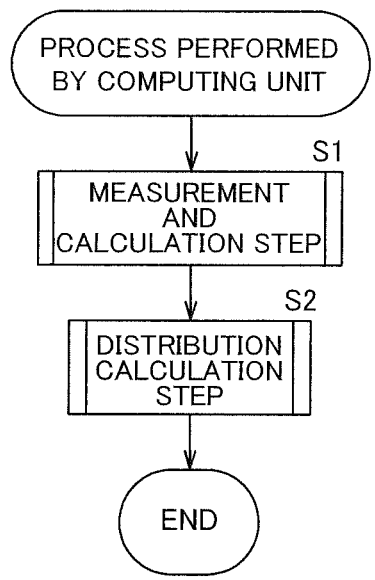
FIG. 5A is a flow chart illustrating the process performed by the computing unit.
Figure 5B:
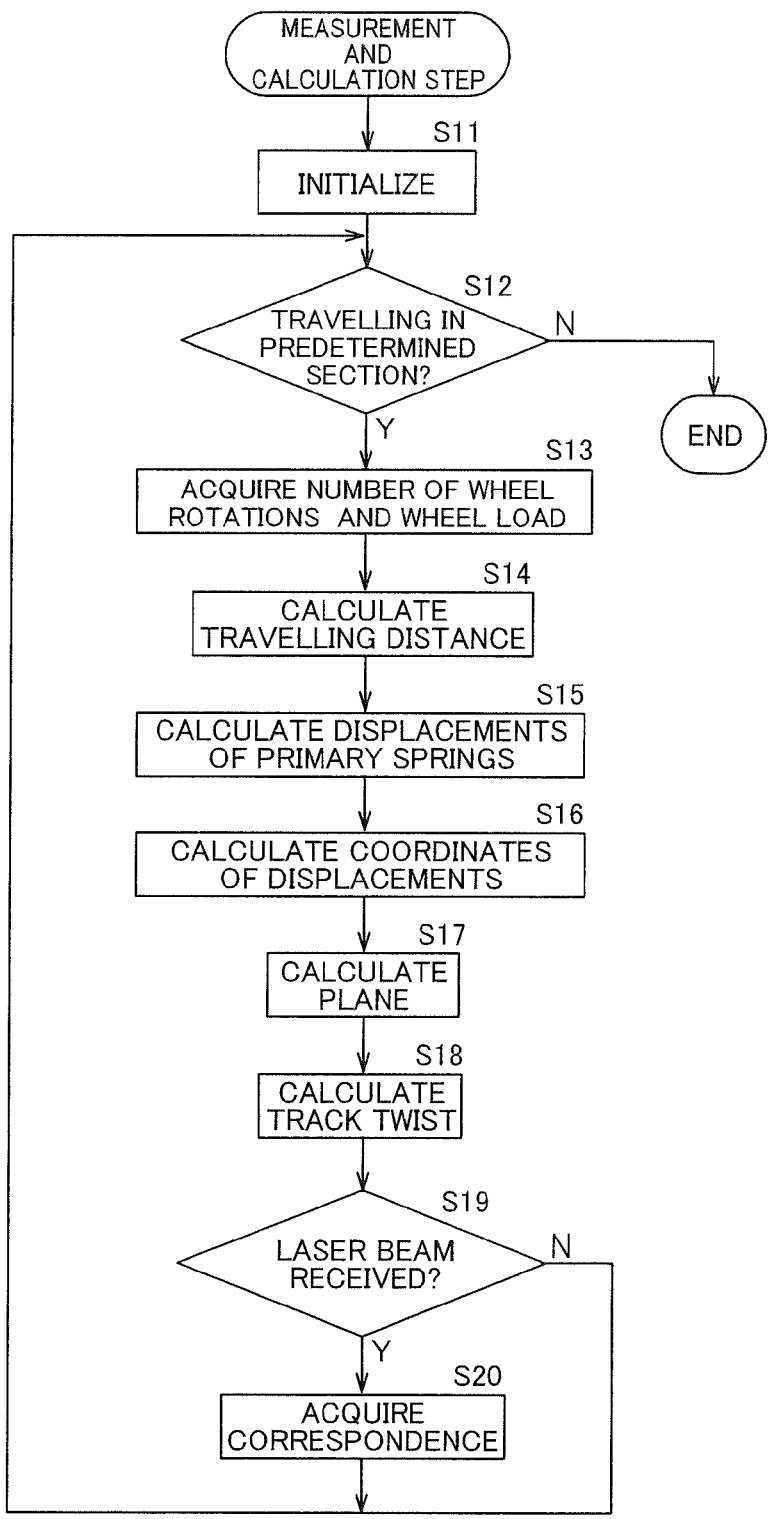
FIG. 5B is a flow chart illustrating the measurement and calculation step performed by the computing unit.
Figure 5C:
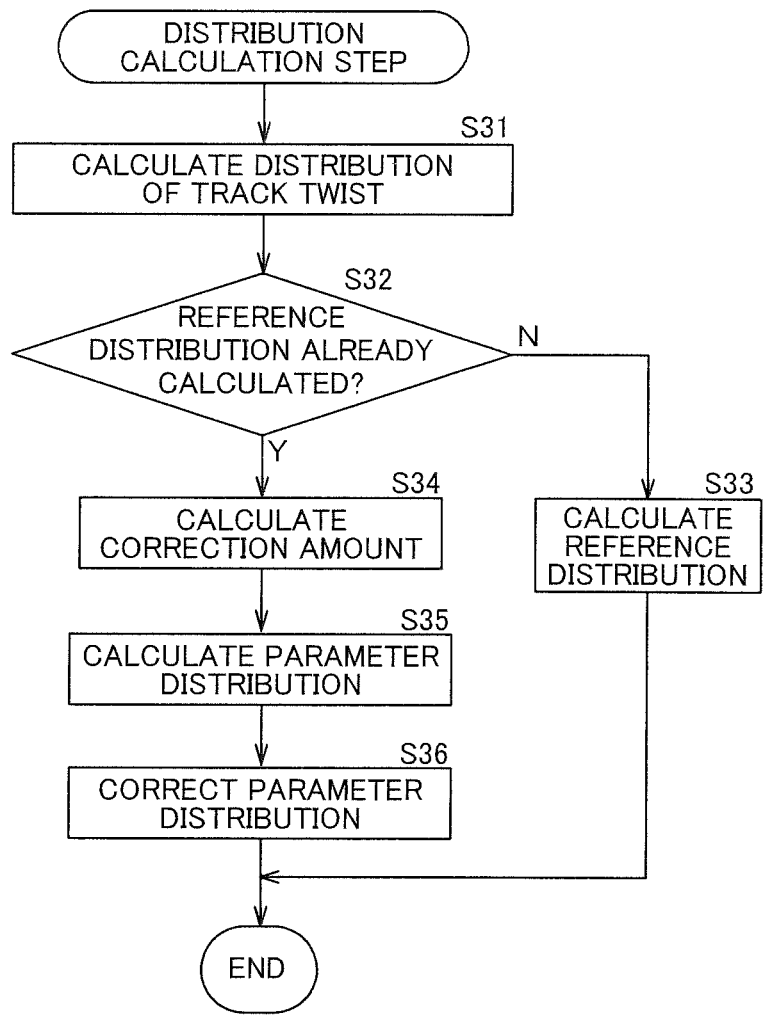
FIG. 5C is a flow chart illustrating the distribution calculation step performed by the computing unit.

FIG. 5A is a flow chart illustrating the process performed by the computing unit 20. As shown in FIG. 5A, the computing unit 20 performs a measurement and calculation step (step S1) and a distribution calculation step (step S2). FIG. 5B is a flow chart illustrating the measurement and calculation step performed by the computing unit 20. FIG. 5C is a flow chart illustrating the distribution calculation step performed by the computing unit 20. The steps performed by the computing unit 20 are not limited to those shown in FIGS. 5A to 5C. The steps shown in FIGS. 5A to 5C are merely examples.

When the vehicle for commercial operation 100 is travelling in a predetermined section (YES at step S12), the computing unit 20 acquires the number of rotations and wheel load of the wheel 1 (step S13). The predetermined section suitably includes the section for which a distribution of track twist is to be calculated. It may be determined whether the vehicle is in the predetermined section based on the number or rotations of the wheel 1, for example. Alternatively, the computing unit 20 may only determine whether the vehicle for commercial operation 100 is travelling or not. The number of rotations is derived from the counter value of the counter stored in the computing unit 20. The counter updates the counter value each time an output signal from a pulse generator that detects the number of rotations of the wheel 1 is input. The counter value is initialized when the measurement and calculation step is initiated (step S11). The wheel load may be derived from measurements by the strain gauge, for example.

The computing unit 20 calculates the travelling distance of the vehicle for commercial operation 100 (or bogie 10) starting from a predetermined origin based on the number of rotations of the wheel 1 (step S14). More specifically, the travelling distance is calculated by multiplying the circumference of the wheel 1 stored in the computing unit 20 by the number of rotations of the wheel 1. The circumference of the wheel 1 is calculated from the outer diameter of the wheel 1 found when the wheel begins to be used. Since the calculated travelling distance is based on the number of rotations of the wheel 1, it has an error caused by wear of the wheel 1, for example.

Based on the measurements of wheel load, the computing unit 20 calculates the displacements of the four primary springs 2 (step S15). The displacements of the primary springs 2 are calculated in the manner discussed above. Thus, no description will be provided here.

The computing unit 20 calculates the coordinates of the displacements of the primary springs 2 from the calculated displacements of the primary springs 2 (step S16). The coordinates of the displacements of the primary springs 2 are calculated in the manner discussed above. Thus, no description will be provided here.

The computing unit 20 calculates the plane that passes through the calculated coordinates of the displacements of three of the four primary springs 2 (step S17). The plane is calculated in the manner discussed above. Thus, no description will be provided here.

Based on the distance between the calculated plane and the coordinates of the displacement of the remaining primary spring, the computing unit 20 calculates the track twist of the track (step S18). The track twist is calculated in the manner discussed above. Thus, no description will be provided here.

The computing unit 20 acquires the correspondence between the travelling distance calculated at the position on the track R separated from a predetermined origin by a known distance and the distance of the position from the origin (i.e. known distance), and stores it (step S20).

To acquire the above correspondence, for example, reflective plates may be provided by two positions on the track R separated from a predetermined origin by distances that are known from accurate surveys. A light projecting/receiving photoelectronic sensor is provided on the vehicle for commercial operation 100. Laser beams are directed by the photoelectronic sensor to the reflective plates. At the time points where laser beams reflected from the reflective plates are received by the photoelectronic sensor (YES at step S19), it is recognized that the vehicle for commercial operation 100 has arrived at the two positions on the track R. The travelling distances of the vehicle 100 calculated based on the numbers of rotations of the wheel 1 at these times are recognized. The computing unit 20 receives output signals from the photoelectronic sensor (i.e. signals indicating that reflected laser beams have been detected). The computing unit 20 stores the distances of the two positions on the track R starting from the predetermined origin. The computing unit 20 acquires the correspondence between the (two) positions on the track R separated from the predetermined origin by known distances and the travelling distances of the vehicle 100 calculated based on the numbers of rotations of the wheel 1 at these positions. For example, it is assumed that the two positions on the track R are separated from the predetermined origin by the distances of kilopost values X1 and Y1, and the travelling distances of the vehicle for commercial operation 100 calculated based on the numbers of rotations of the wheel 1 at these positions have kilopost values X2 and Y2. Then, the relationship represented by kilopost value X2 corresponding to kilopost value X1 and kilopost value Y2 corresponding to kilopost value Y1 is acquired, and is stored in the computing unit 20.

When the vehicle has finished travelling in the predetermined section (NO at step S12), the computing unit 20 calculates the distribution of track twist of the track R (step S31). The distribution of track twist has a first axis (for example, X axis) representing the calculated travelling distance and a second axis perpendicular to the first axis (for example, Y axis) representing the calculated track twist. The travelling distance in the calculated distribution of track twist has been calculated based on the number of rotations of the wheel. As such, it has an error caused by wear, a slip and skid of the wheel.

If no distribution of track twist serving as a reference (i.e. reference distribution) has been calculated (NO at step S32), the computing unit 20 corrects the calculated distribution of the track twist of the track R based on the correspondence stored in the above manner (step S33). More specifically, the calculated distribution of the track twist of the track R is corrected in such a way that the first axis represents the true travelling distance of the vehicle for commercial operation 100. Since the position at a travelling distance (i.e. travelling distance calculated based on the number or rotations of the wheel 1) of kilopost value X2 in the distribution of the track twist of the track R has kilopost value X1 in reality and the position at a travelling distance (i.e. travelling distance calculated based on the number of rotations of the wheel 1) of kilopost value Y2 in the distribution of track twist of the track R has kilopost value Y1 in reality, the computing unit 20 translates and/or expands/contracts (i.e. corrects) the distribution of track twist of the track R with respect to the first axis so as to provide true values (i.e. in such a way that the first axis represents the true travelling distance of the vehicle for commercial operation 100). Then, the corrected distribution of track twist is stored as a reference distribution.

If a reference distribution has been calculated (YES at step S32), the computing unit 20 corrects, with respect to the first axis, the calculated distribution (i.e. object distribution) of the track twist of the track R, i.e. distribution of track twist calculated after calculation of the reference distribution for the same track R so as to match the object distribution of the track twist of the track R to the stored reference distribution, and calculates the correction amount for this correction (step S34).

Figure 6A:
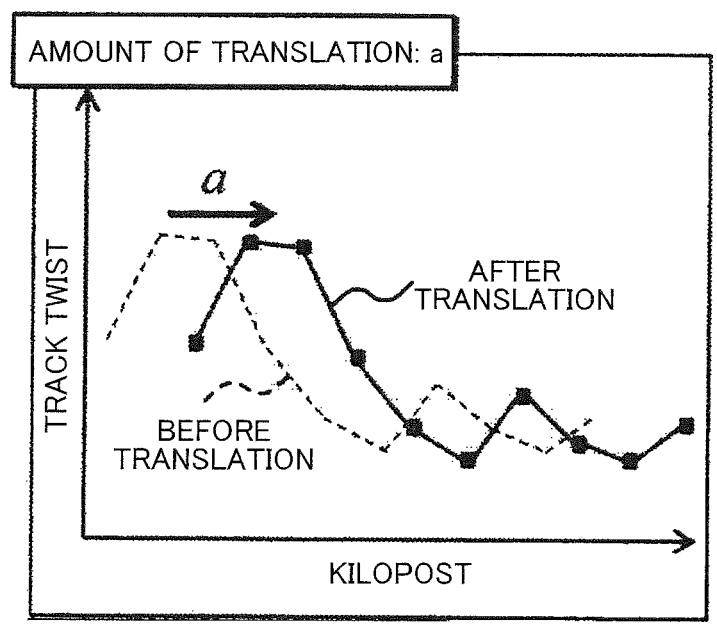
FIG. 6A is a graph illustrating an example of correction in which the object distribution is translated with respect to the first axis.
Figure 6B:
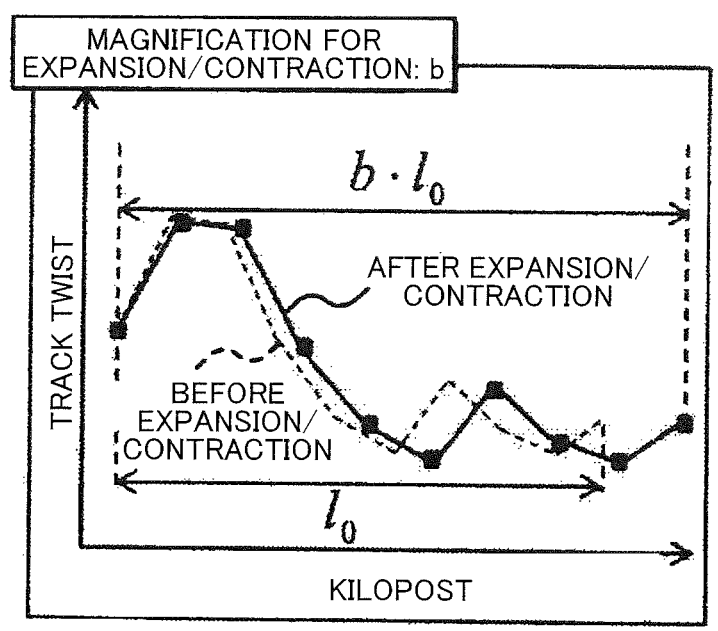
FIG. 6B is a graph illustrating an example of correction in which the object distribution is expanded/contracted with respect to the first axis.
Figure 6C:
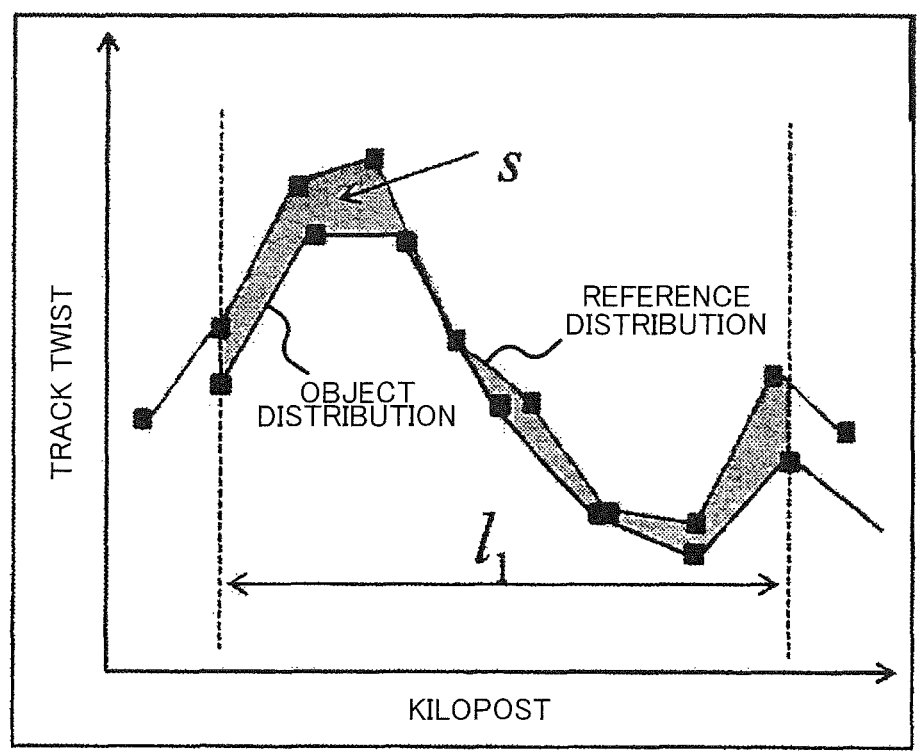
FIG. 6C is a graph illustrating an object distribution matched to a reference distribution.
Figure 6D:
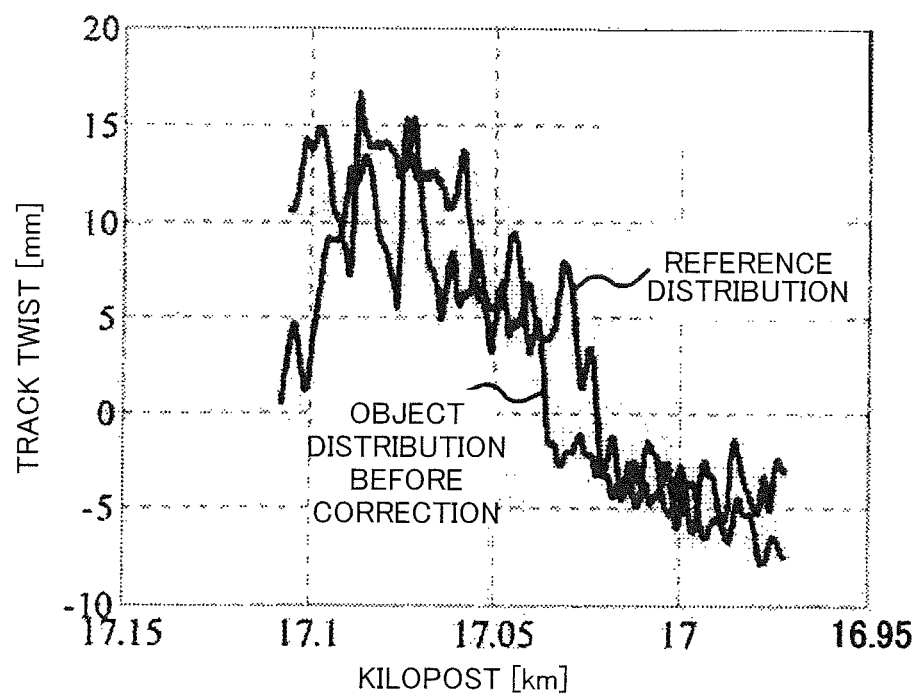
FIG. 6D is a graph illustrating a reference distribution and an object distribution before correction.
Figure 6E:
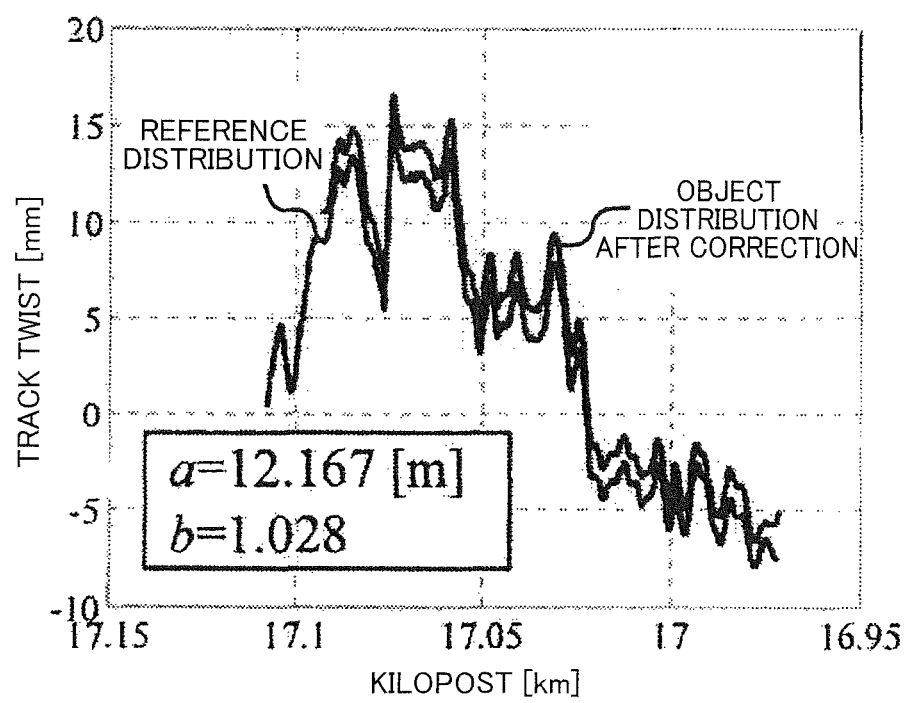
FIG. 6E is a graph illustrating the reference distribution and the object distribution after correction.

FIG. 6A is a graph illustrating an example of correction in which the object distribution is translated with respect to the first axis. FIG. 6B is a graph illustrating an example of correction in which the object distribution is expanded/contracted with respect to the first axis. FIG. 6C is a graph illustrating an object distribution matched to a reference distribution. FIG. 6D is a graph illustrating a reference distribution and an object distribution before correction. FIG. 6E is a graph illustrating the reference distribution and the object distribution after correction.

Referring to FIG. 6C, when the object distribution matches the reference distribution, the value of the evaluation function $f=S/l_1$ is at its minimum. Here, $l_1$ indicates the distance of the predetermined section. S indicates the area formed between the reference distribution and object distribution for the section of the distance $l_1$.

As shown in FIGS. 6A to 6E, the computing unit 20 corrects (i.e. translates and/or expands/contracts) the object distribution with respect to the first axis by a matching approach using the simplex method, for example, so as to match the object distribution to the reference distribution. That is, the amount of translation a and/or the magnification for expansion/contraction b are determined.

Such correction is based on the idea that, since variations in track twist calculated for the same track R are relatively small, just correcting, with respect to the first axis, an object distribution that may have a calculation error in terms of travelling distance will match this distribution to the reference distribution. The travelling distance represented on the first axis of the object distribution after the above correction is proximate to the true travelling distance. The computing unit 20 stores the amount of correction of the above correction (i.e. amount of translation a and/or magnification for expansion/contraction b).

The computing unit 20 calculates the distribution of a parameter relating to the wheel load used in calculating the track twists that constitute the object distribution (i.e. parameter distribution) (step S35). The parameter may be wheel load itself or derailment coefficient, for example. The parameter distribution has a first axis representing the travelling distance of the vehicle for commercial operation 100 starting from the predetermined origin calculated based on the number of rotations of the wheel 1, and a second axis representing the above parameter. The travelling distance in the parameter distribution has been calculated based on the number of rotations of the wheel. As such, it has an error due to wear of the wheel, for example.

Based on the calculated correction amount, the computing unit 20 corrects the calculated parameter distribution (step S36). More specifically, the computing unit 20 corrects the parameter distribution with respect to the first axis by the same amount as the above correction amount (i.e. amount of translation a and/or magnification for expansion/contraction b). This is based on the idea that the time point for calculating the track twists constituting the object distribution is the same as the time point for calculating the parameter for the parameter distribution and the travelling distance represented on the first axis of each of these distributions (i.e. travelling distance of the vehicle for commercial operation 100 calculated based on the number of rotations of the wheel 1) has the same calculation error, which means that the same correction is suitably done in order that the first axis of the parameter distribution represents the true travelling distance of the vehicle 100. The travelling distance represented on the first axis of the parameter distribution that has been corrected in the above manner is proximate to the true travelling distance.

According to the above implementation, the travelling distance represented on the first axis of the parameter distribution (i.e. travelling distance of the vehicle for commercial operation 100 calculated based on the number of rotations of the wheel 1) is corrected to be proximate to the true travelling distance. This makes it possible to precisely identify the position on the track R where the parameter relating to the wheel load (for example, derailment coefficient) has an abnormal value. Thus, the track R may be repaired at the appropriate position, for example.

Further, the correspondence between the position on the track R separated from the predetermined origin by a known distance and the travelling distance of the vehicle for commercial operation 100 calculated based on the number of rotations of the wheel 1 at this position may be obtained only when a reference distribution is to be calculated. For example, a correspondence may be obtained in a non-operation period, such as in the middle of the night, and the photoelectronic sensor need not frequently project laser beams to and receive such beams from the reflective plates during daytime. Once a reference distribution has been calculated, this reference track twist distribution is suitably used to correct parameter distributions. Thus, according to the above implementation, the travelling distance represented on the first axis of the parameter distribution may be corrected so as to be proximate to the true travelling distance with less trouble and safely.

Although embodiments of the present invention have been described in detail, these embodiments are merely examples and the present invention is not limited in any way to the above embodiments.

For example, the computing unit 20 may calculate the travelling distance, the displacements of the primary springs, the coordinates of the displacements, the plane and the track twist after the vehicle has finished travelling in the predetermined section.

The invention claimed is:

1. A method of measuring a condition of a track using a vehicle for commercial operation,
   wherein the vehicle for commercial operation includes a bogie including four wheels and four primary springs corresponding to the four wheels and supporting the corresponding wheels, and capable of measuring a wheel load of each of the four wheels,
   the method comprising the steps of:
   measuring the wheel load of each of the wheels;
   calculating a displacement of each of the primary springs based on the measured wheel load; and
   calculating a track twist of the track based on the calculated displacements.

2. The method according to claim 1, further comprising the steps of:
   calculating a travelling distance of the vehicle for commercial operation starting from a predetermined origin based on a number of rotations of one of the four wheels;
   calculating a distribution of the track twist based on the calculated travelling distance and the calculated track twist;
   acquiring a correspondence between the travelling distance calculated at a position separated from the origin by a known distance and the distance from the origin;
   correcting the calculated distribution of the track twist based on the acquired correspondence to calculate a reference distribution of the track twist; and
   calculating a correction amount for matching an object distribution calculated after calculation of the reference distribution to the reference distribution.

3. The method according to claim 2, wherein:
   to calculate the distribution, the step of calculating a distribution uses a first axis to represent the calculated travelling distance and uses a second axis perpendicular to the first axis to represent the calculated track twist,
   the step of calculating a reference distribution corrects the distribution and uses the first axis to represent a true travelling distance of the vehicle for commercial operation, and,
   to calculate the correction amount, the step of calculating a correction amount corrects the object distribution with respect to the first axis.

4. The method according to claim 3, further comprising the steps of:
   calculating a distribution of a parameter relating to the wheel load, the parameter being used in calculating track twists constituting the object distribution; and
   correcting the distribution of the parameter based on the correction amount.

5. The method according to claim 4, wherein, to calculate the distribution of the parameter, the step of calculating a distribution of a parameter uses the first axis to represent the travelling distance and uses the second axis to represent the parameter.

6. A vehicle for commercial operation for measuring a condition of a track, comprising:
   a bogie including four wheels and four primary springs corresponding to the four wheels and supporting the corresponding wheels, and capable of measuring a wheel load of each of the wheels; and
   a computing unit configured to measure the condition of the track based on the wheel load of each of the wheels, the computing unit including:
   a wheel load measuring unit configured to measure the wheel load of each of the wheels;
   a spring displacement calculating unit configured to calculate displacements of the primary springs based on the measured wheel loads; and
   a track twist calculating unit configured to calculate the track twist of the track based on the calculated displacements.

7. The vehicle for commercial operation according to claim 6, wherein the computing unit further includes:
   a travelling distance calculating unit configured to calculate a travelling distance of the vehicle for commercial operation starting from a predetermined origin based on a number or rotations of one of the four wheels;
   a distribution calculating unit configured to calculate a distribution of the track twist based on the calculated travelling distance and the calculated track twist;
   a correspondence acquiring unit configured to acquire a correspondence between the travelling distance calculated at a position separated from the origin by a known distance and the distance from the origin;
   a reference distribution calculating unit configured to correct the calculated distribution of the track twist based on the acquired correspondence to calculate a reference distribution of the track twist; and
   a correction amount calculating unit configured to calculate a correction amount for matching an object distribution calculated after calculation of the reference distribution to the reference distribution.

8. The vehicle for commercial operation according to claim 7, wherein:
   to calculate the distribution, the distribution calculating unit uses a first axis to represent the calculated travelling distance and uses a second axis perpendicular to the first axis to represent the calculated track twist,
   the reference distribution calculating unit corrects the distribution and uses the first axis to represent a true travelling distance of the vehicle for commercial operation, and, to calculate the correction amount, the correction amount calculating unit corrects the object distribution with respect to the first axis.

9. The vehicle for commercial operation according to claim 8, further comprising:
a parameter distribution calculating unit configured to calculate a distribution of a parameter relating to the wheel load, the parameter being used in calculating track twists constituting the object distribution, and
a parameter distribution correcting unit configured to correct the distribution of the parameter based on the correction amount.

10. The vehicle for commercial operation according to claim 9, wherein, to calculate the distribution of the parameter, the parameter distribution calculating unit uses the first axis to represent the travelling distance and uses the second axis to represent the parameter.

11. The method according to claim 2, further comprising the steps of:
calculating a distribution of a parameter relating to the wheel load, the parameter being used in calculating track twists constituting the object distribution; and
correcting the distribution of the parameter based on the correction amount.

12. The vehicle for commercial operation according to claim 7, further comprising:
a parameter distribution calculating unit configured to calculate a distribution of a parameter relating to the wheel load, the parameter being used in calculating track twists constituting the object distribution, and
a parameter distribution correcting unit configured to correct the distribution of the parameter based on the correction amount.

* * * * *